G. HATTON.
GAS PRODUCER.
APPLICATION FILED AUG. 21, 1905.
925,634.
Patented June 22, 1909.
3 SHEETS—SHEET 3.
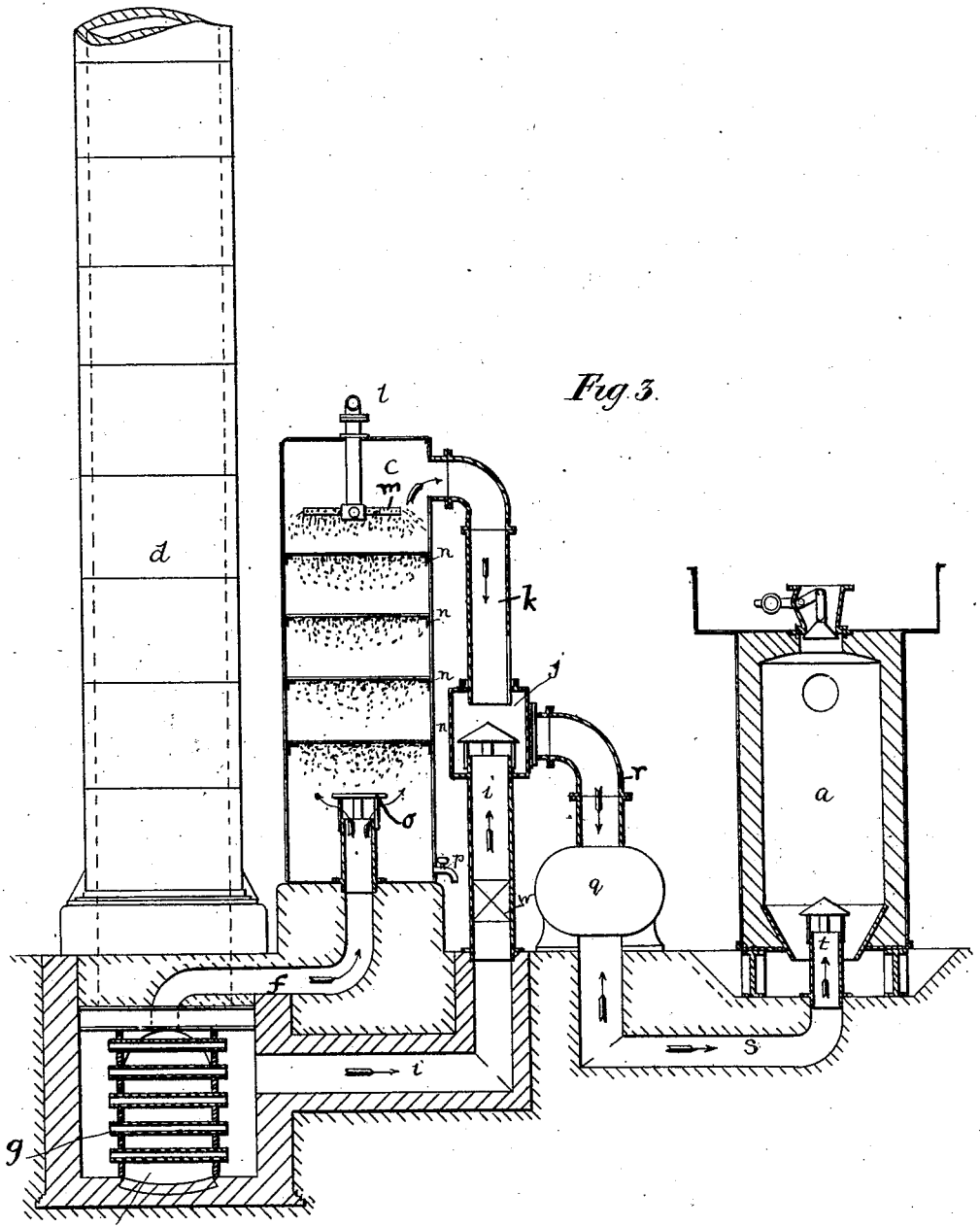

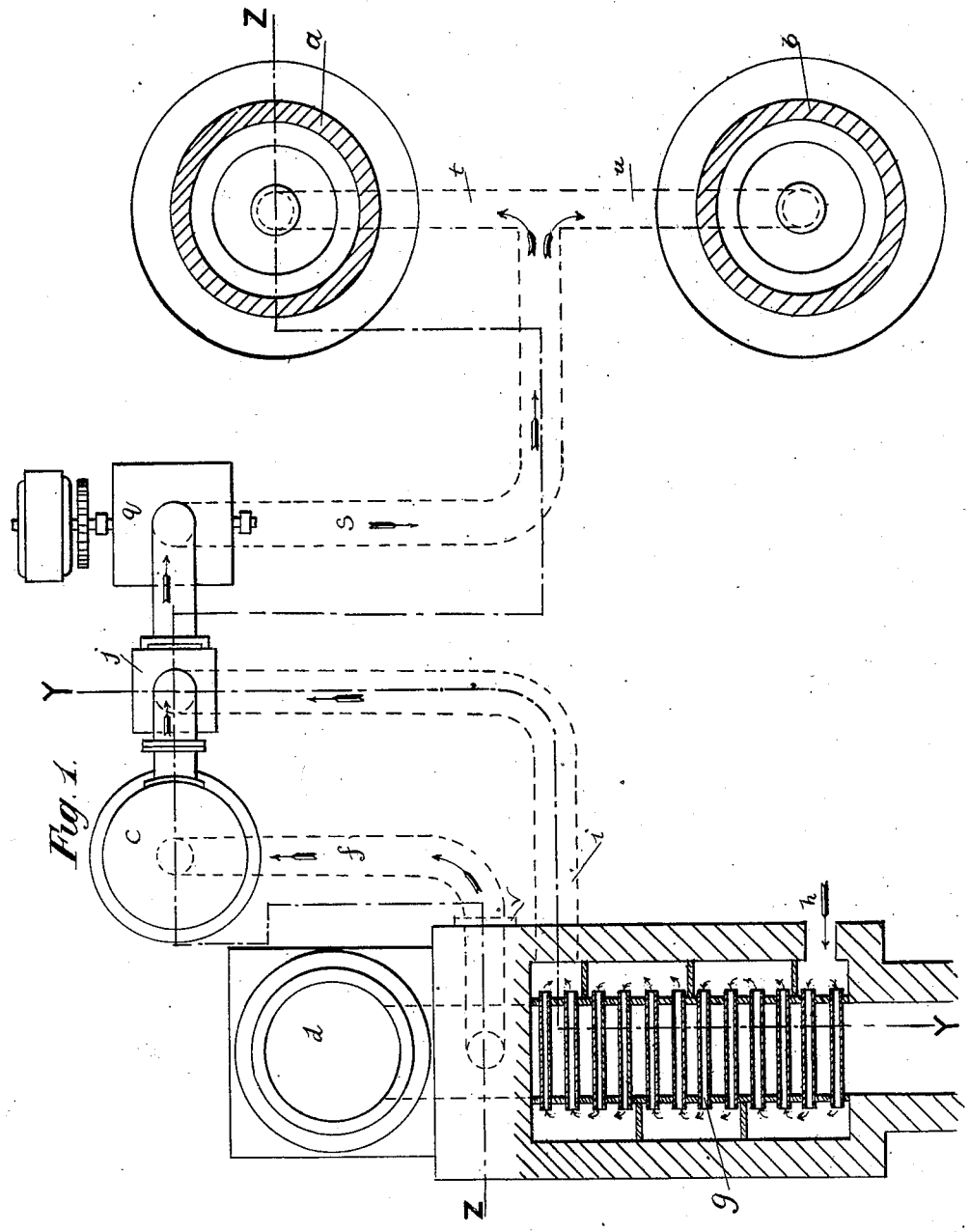

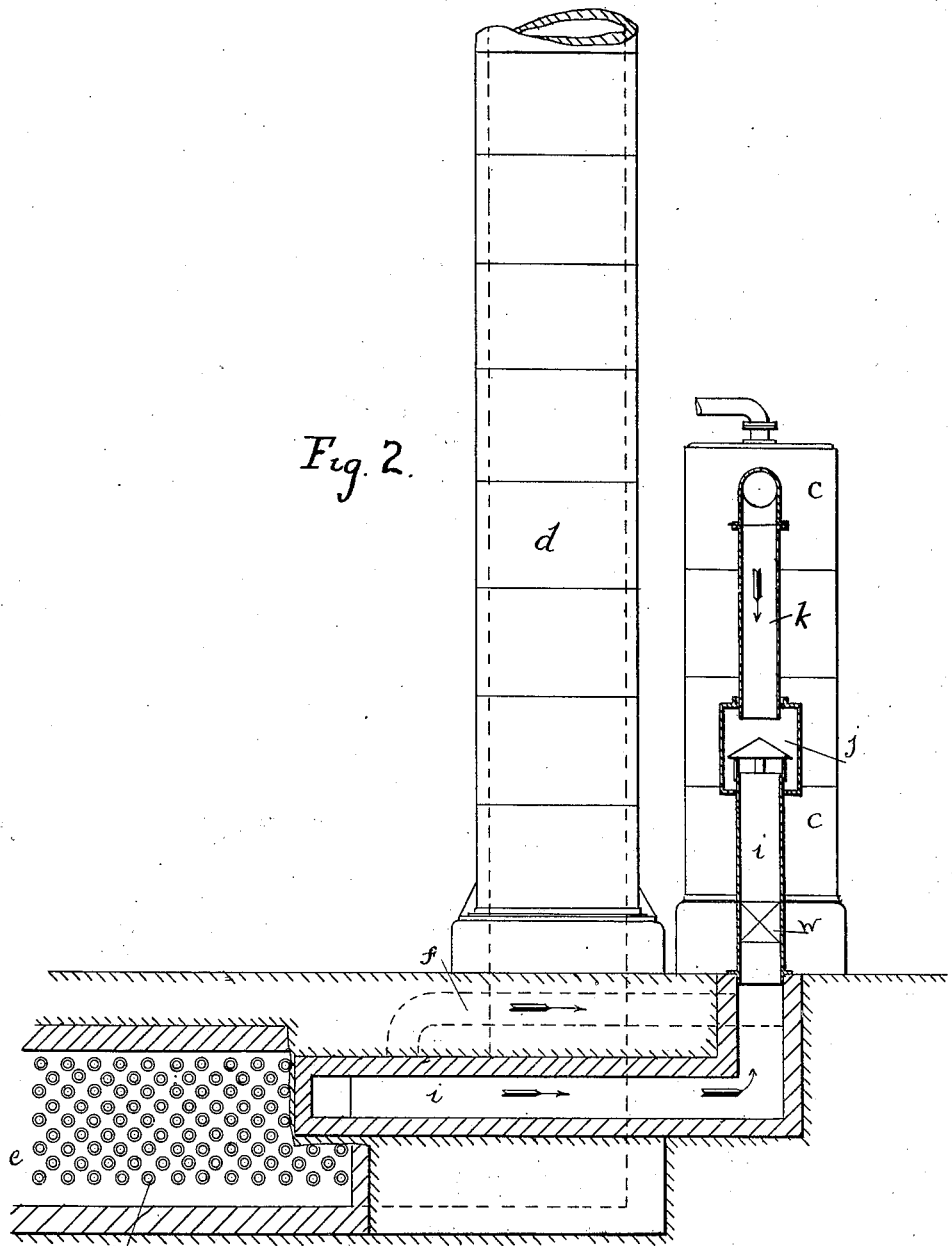

UNITED STATES PATENT OFFICE.

GEORGE HATTON, OF SALTSWELLS HOUSE, NEAR BRIERLEY HILL, ENGLAND.

GAS-PRODUCER.

No. 925,634.  Specification of Letters Patent.  Patented June 22, 1909.

Application filed August 21, 1905. Serial No. 275,081.

*To all whom it may concern:*

Be it known that I, GEORGE HATTON, a subject of His Majesty the King of Great Britain and Ireland, residing at Saltswells House, near Brierley Hill, county of Stafford, England, have invented new and useful Improvements in Gas-Producers, of which the following is a specification.

In the working of gas producers there are well known advantages in introducing into the producer atmospheric air mixed with a large proportion of steam or water vapor, and the methods hitherto generally employed have been either to blow in the atmospheric air by means of a jet of steam at considerable pressure, the air and steam entering the producer as a mixture, or to collect the exhaust steam from steam engines, which, together with atmospheric air is driven into the producer by means of a fan or blower, or by blowing atmospheric air through a water tower which is fed with a supply of hot water, thus charging the air with moisture, and thence into the producer. The first of these methods is expensive, as the steam under pressure is obtained by the combustion of fuel, for the second and third methods neither exhaust steam, nor hot water respectively, is always available.

My invention avoids the disadvantages of any of these methods and is carried out as follows:—I employ a chamber which I call the vaporizing chamber connected by means of a flue or pipe to the base of the chimney of a furnace of any type from which the escaping heat is sufficiently great, and I divert as much heat as is necessary for my purpose from the chimney into the chamber, into which chamber I also introduce a sufficient supply of water broken into a spray. The heat converts the water into vapor, which is exhausted from the chamber by means of a fan or blower, and being mixed with the necessary proportion of atmospheric air it is thus driven into the gas producer. The supply of heat and water to the chamber, as also the supply of atmospheric air to the fan or blower, is regulated by valves, so that the right proportions are always under control.

The accompanying drawings illustrate an arrangement of my invention for supplying the mixed atmospheric air and steam or water vapor to two gas producers.

Figure 1 is a plan of the apparatus; Fig. 2 is a sectional side elevation of the same taken about on line Y Y of Fig. 1 and Fig. 3 is a sectional front elevation of the same taken about on line Z Z of Fig. 1.

The same letters of reference indicate the same parts in all the figures.

The two gas producers are respectively marked $a$ $b$; $c$ is the vaporizing chamber; $d$ is a furnace chimney receiving products of combustion from a furnace by the flue $e$ from which heated products of combustion is diverted to the vaporizing chamber $c$ by the flue $f$; $g$ is an ordinary hot air stove in the flue $e$ for the purpose of heating the atmospheric air to mix with the steam or vapor formed in the chamber $c$ the cold air entering the stove at $h$ and passing through the pipes of the stove and out along the passage $i$ to the mixing box $j$ the upper part of which has an inlet pipe $k$ communicating from the upper part of the vaporizing chamber $c$ to lead the vapor therefrom into the mixing box $j$; $l$ is the water supply pipe to the upper part of the chamber $c$ formed with a spray pipe $m$ at its lower end through which the water falls in a spray through the ordinary perforated trays $n$, or any other well known means may be used in the chamber $c$ for delivering water in a spray so as to be vaporized by the heated products of combustion entering the chamber by the pipe $f$. It is to be understood that the top of this pipe $f$ is open but fixed a short distance above it there is a baffle plate $o$ to prevent the water from running down the pipe.

$p$ is an outlet tap at the bottom of the chamber $c$ for letting out any superfluous water which is not vaporized.

$q$ is an ordinary exhausting and blowing fan having an inlet pipe $r$ connected to the mixing box $j$ and its outlet pipe $s$ leading by branches $t$ $u$ to the lower parts of the gas producers $a$, $b$ so as to supply the mixed atmospheric air and steam or water vapor thereto.

It will be seen that when the apparatus is at work the exhauster $q$ draws heated products of combustion from the flue $e$ through the flue $f$ to the chamber $c$ thereby vaporizing the sprayed water therein so that the vapor thus formed passes through the outlet pipe $k$ into the mixing box $j$ where it meets the hot atmospheric air which has been drawn by the exhauster $q$ through the stove $g$ and pipe $i$ to the mixing box $j$ where it mixes with the vapor and from thence is drawn by the exhauster $q$ and forced through the pipes $s$, $t$, $u$ into the gas producers $a$, $b$.

It will be understood that there is an ordinary valve (not shown on my drawings) for regulating the supply of water through the pipe $l$ to the vaporizing chamber and there is also a valve or damper at $v$ for regulating the supply of heat to the vaporizing chamber $c$ and there is also a valve at $w$ to regulate the supply of atmospheric air to the mixing box $j$ so that the right proportions are also under control.

The accompanying drawings illustrate what I find to be a good way of carrying out my invention, but it is to be understood that my invention is not limited to the precise details shown as it will be evident that these may be varied in many ways without departing from the nature of my invention.

Means for heating the atmospheric air to be mixed with the steam or water vapor from the vaporizing chamber may if desired be dispensed with, and cold atmospheric air be used instead, but I prefer to use the air hot because, if the air is cold, it causes a certain amount of condensation of the steam or water vapor.

What I claim as my invention and desire to secure by Letters Patent is:—

In combination with a gas producer, the improved means for producing and supplying mixed atmospheric air and steam or water vapor thereto, comprising in combination, a chimney, a vaporizing chamber containing a water spray and receiving into its interior the waste products of combustion from the chimney flue, a mixing box receiving the steam or water vapor and the waste products of combustion from said vaporizing chamber, a heated atmospheric air supply to said mixing box, and a blower adapted to draw the atmospheric air into the mixing box and the waste products of combustion from the chimney flue through the vaporizing chamber so as to vaporize the water spray therein and mix the same in the mixing box with the atmospheric air and deliver said mixture into the gas producer, substantially as set forth.

In testimony whereof I have signed my name to this specification in the presence of two subscribing witnesses.

GEORGE HATTON.

Witnesses:
GEORGE ARTHUR LYON HATTON,
THOMAS JOHN ROWE.